United States Patent
Shen et al.

(10) Patent No.: US 8,982,447 B2
(45) Date of Patent: Mar. 17, 2015

(54) DISPLAY PANEL AND DRIVING METHOD THEREOF

(71) Applicant: HTC Corporation, Taoyuan County (TW)

(72) Inventors: Weng-Chang Shen, Taoyuan County (TW); Hsu-Hsiang Tseng, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 86 days.

(21) Appl. No.: 13/865,983

(22) Filed: Apr. 18, 2013

(65) Prior Publication Data

US 2014/0313564 A1    Oct. 23, 2014

(51) Int. Cl.
*G02B 26/00*    (2006.01)
*G02F 1/167*    (2006.01)

(52) U.S. Cl.
CPC ...................................... *G02F 1/167* (2013.01)
USPC ............................ 359/296; 359/290; 359/228

(58) Field of Classification Search
USPC ........ 359/237–324; 345/55, 107, 30, 84, 204, 345/690
See application file for complete search history.

(56) References Cited

U.S. PATENT DOCUMENTS

| 7,667,684 | B2 | 2/2010 | Jacobson et al. |
| 8,115,729 | B2 | 2/2012 | Danner et al. |
| 2005/0104844 | A1* | 5/2005 | Nakai et al. .................... 345/107 |
| 2009/0231267 | A1* | 9/2009 | Uchida ......................... 345/107 |

* cited by examiner

*Primary Examiner* — Thomas K Pham
*Assistant Examiner* — Sharrief Broome
(74) *Attorney, Agent, or Firm* — Jianq Chyun IP Office

(57) ABSTRACT

A display panel includes a first substrate, a second substrate and a plurality of pixel units. The pixel units are disposed between the first substrate and the second substrate, and each of the pixel units includes a reflective electrode disposed on the first substrate, a plurality of colored charged particles located between the reflective electrode and the second substrate and a lateral electrode disposed on the first substrate and extended towards the second substrate. When a first voltage is applied to the reflective electrode, the charged particles are repelled to the second substrate to display the color of the charged particles due to the affection of a first electric field, when a second voltage is applied to the lateral electrode, the charged particles are attracted to the lateral electrode due to the affection of a second electric field. Further, a driving method of a display panel is also provided.

9 Claims, 3 Drawing Sheets

DISPLAY PANEL AND DRIVING METHOD THEREOF

BACKGROUND

1. Technical Field

The disclosure relates to a display panel and a driving method thereof, and more particularly to a display panel capable of performing various operations in accordance with voltage control and a driving method thereof.

2. Related Art

Along with the development of electronic and display technologies, the display panels selling in market all achieve a certain quality on image displaying even though the technique applied by those display panels for displaying may be different. Further, those display panels are used in various electronic devices, such as cell phones, e-books, televisions or portable tablets, so as to show the information to the users. The electronic paper display is one of the mentioned display panels. In general, electronic ink in the display is controlled by the electronic paper display through the voltage, so that images and words can be shown to the users by electronic ink. Due to the advantages such as low power consumption, electronic paper display is widely used in the electronic apparatuses, for example, the e-books.

However, the electronic paper display which only has the display function (or in other words, the display which only has the display function) is not sufficient to meet requirement of multifunctionality. Therefore, the people in the art related to the display technology are also focus on developing other functions for the display panel, so as to provide a better and more comprehensive electronic display apparatus.

SUMMARY

The disclosure is directed to a display panel and a driving method thereof, where the display panel can be used to perform various operation modes and functions by applying different voltages to control the display panel, so as to improve the diversity and the capability of the display panel in usage.

The disclosure provides a display panel including a first substrate, a second substrate and a plurality of pixel units. The pixel units are disposed between the first substrate and the second substrate, and each of the pixel units includes a reflective electrode, a plurality of colored charged particles and a lateral electrode. The reflective electrode is disposed on the first substrate, the charged particles are located between the reflective electrode and the second substrate, and the lateral electrode is disposed on the first substrate and extended towards the second substrate. When a first voltage is applied to the reflective electrode, the colored charged particles in the pixel unit are repelled to the second substrate due to the affection of a first electric field, and the color of the charged particles is displayed through the second substrate. When a second voltage is applied to the lateral electrode, the colored charged particles in the pixel unit are attracted to the lateral electrode due to the affection of the second electric field, and an incident light is reflected out of the display panel through the second substrate by the reflective electrode.

The disclosure provides a driving method of a display panel, where the display panel includes a first substrate, a second substrate and a plurality of pixel units disposed between the first substrate and the second substrate. Each of the pixel units includes a plurality of colored charged particles, a reflective electrode and a lateral electrode. The reflective electrode and the lateral electrode are disposed on the first substrate, and the lateral electrode is further extended towards the second substrate. The colored charged particles are disposed between the reflective electrode and the second substrate. The driving method includes the following steps. A first voltage is applied to the reflective electrode such that the colored charged particles are repelled to the second substrate due to the affection of a first electric field, and the color of the charged particles is displayed through the second substrate. A second voltage is applied to the lateral electrode such that the colored charged particles are attracted to the lateral electrode due to the affection of a second electric field, and an incident light is reflected out of the display panel through the second substrate by the reflective electrode.

According to the above descriptions, the display panel provided by the disclosure utilizes different voltages to control the colored charged particles. When a voltage is applied to the reflective electrode, the charged particles display their color through the second substrate. In addition, when a voltage is applied to the lateral electrode, the charged particles are attracted to the lateral electrode to expose the reflective electrode, so that the incident light is reflected out of the display panel by using the reflective electrode and the second substrate. Accordingly, the display panel can be used in providing several functions such as image displaying and mirroring, so the display panel has a broader usage. The disclosure further provides a driving method of the display panel, where the driving method controls the display panel to switch in accordance with the different operations by applying different voltages to different electrodes.

In order to make the aforementioned and other features and advantages of the disclosure comprehensible, several exemplary embodiments accompanied with figures are described in detail below.

DETAILED DESCRIPTION OF DISCLOSED EMBODIMENTS

Generally speaking, the display panel only has the function of image displaying but lack of other functions. Therefore, the disclosure provides a display panel capable of displaying images and being used in other application.

Figure 1A:
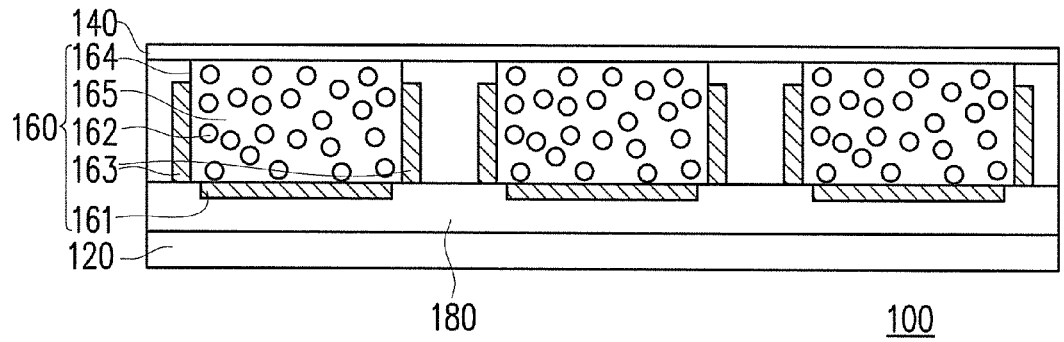
FIG. 1A is a schematic diagram of a display panel according to an embodiment of the disclosure.

FIG. 1A is a schematic diagram of a display panel according to an embodiment of the disclosure. Referring to FIG. 1A, the display panel 100 includes a first substrate 120, a second substrate 140 and a plurality of pixel units 160. The first substrate 120 and the second substrate 140 are relatively disposed. Further, in the present embodiment, at least the second substrate 140 is the transparent substrate, so the light is capable of penetrating through the second substrate 140. The pixel units 160 are disposed between the first substrate 120 and the second substrate 140, and each of the pixel units 160 includes a reflective electrode 161, a plurality of colored charged particles 162 and lateral electrodes 163. The reflective electrode 161 is disposed on the first substrate 120, the colored charged particles 162 are located between the reflective electrode 161 and the second substrate 140, and the lateral electrodes 163 are also disposed on the first substrate 120 and extended towards the second substrate 140. In the present embodiment, an insulation layer 180 can be disposed between the reflective electrodes 161 as a separation.

By using the reflective electrode 161, the charged particles 162 and the lateral electrodes 163, the display panel 100 can input different voltages to control the charged particles 162. When the voltage is applied to the reflective electrode 161, the charged particles 162 are repelled to the second substrate 140, so the charged particles 162 display the color of the charged particles 162 through the second substrate 140 to achieve the effect of image displaying. Moreover, the charged particles 162 can be attracted to the lateral electrodes 163 as well in order to expose the reflective electrode 161 of the pixel unit 160 for reflecting the light. In the following embodiments, the charged particles are shown as the positive particles (using "+" as the label) for description, but those particles can also be the negative particles in other embodiments as well.

Figure 1B:
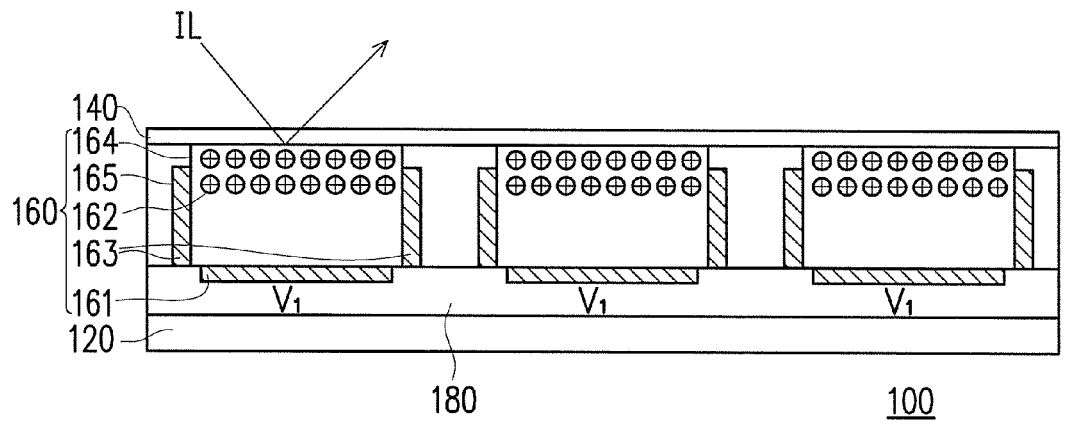
FIG. 1B is a schematic diagram illustrating an operation of the display panel according to an embodiment of the disclosure.

FIG. 1B is a schematic diagram illustrating an operation of the display panel according to an embodiment of the disclosure. Referring to FIG. 1B, when a first voltage V1 is applied to the reflective electrode 161, since the colored charged particles 162 in the pixel unit 160 are positively charged, the charged particles 162 are repelled to the second substrate 140 due to the affection of a first electric field. In the present embodiment, the second substrate 140 is transparent, so the color of the charged particles 162 can be displayed by an incident light IL through the second substrate 140. To be more specific, each of the pixel units 160 can respectively contain the colored charged particles 162 different to others in colors according to the design, so as to achieve the effect of the pixel matrix of an ordinary display panel in affection of the first electric field. For example, the colored charged particles 160 include the red charged particles, green charged particles and blue charged particles respectively disposed in different pixel units 160, so as to display the image. Another example is that, the colored charged particles 162 can only be black, so as to display the effect of writing words.

Figure 1C:
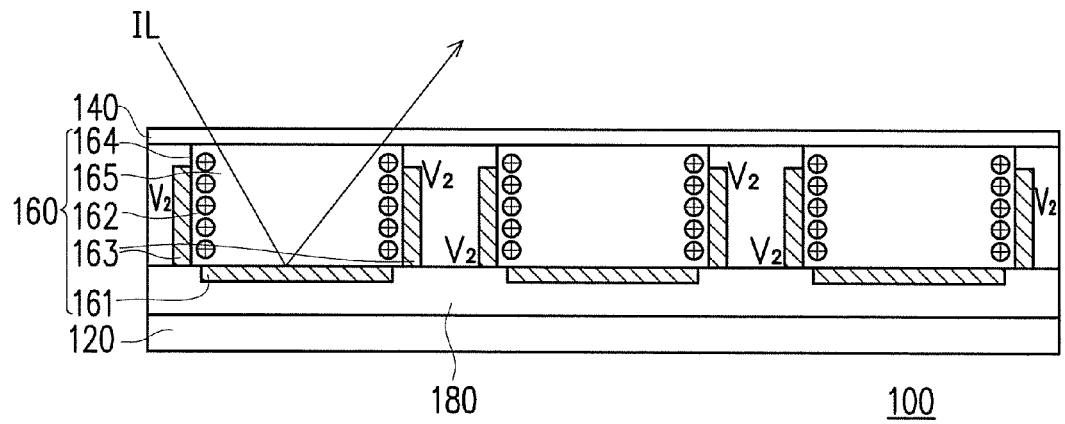
FIG. 1C is a schematic diagram illustrating an operation of the display panel according to another embodiment of the disclosure.

FIG. 1C is a schematic diagram illustrating an operation of the display panel according to another embodiment of the disclosure. Referring to FIG. 1C, when a second voltage V2 is applied to the lateral electrodes 163, the colored charged particles 162 (positively charged) in the pixel unit 160 are attracted to the lateral electrodes 163 due to the affection of a second electric field, so that the incident light IL is reflected out of the display panel 100 through the second substrate 140 by the reflective electrode 161. The reflective electrode 161 can be a metal layer capable of reflecting light, such as the metal in silver color, in order to obtain the reflection effect same as the one shown by a mirror. Based on the previously described example, when the display panel 100 is used under the condition shown in FIG. 1C, then the display panel 100 is used as a mirror. It should be noted that, The first electric field and the second electric field mentioned above are correspondingly generated respectively according to the applied first voltage V1 and the applied second voltage V2, so the magnitudes and the directions of the first electric field and the second electric field can be correspondingly changed by adjusting the first voltage V1 and the second voltage V2. In other words, even the charged particles 162 are the particles with negative charges, the operation methods and the effects shown in FIGS. 1B and 1C can still be achieved by changing the first voltage V1 and the second voltage V2. Furthermore, in the present embodiment, the display panel 100 does not contain the light source, and only the incident light IL is used to display the color of the charged particles 162 or used by the reflective unit 161 in reflection.

Referring to FIG. 1A again, in another embodiment, the pixel unit 160 further includes a micro-container 164 and an electrophoretic liquid 165. The micro-container 164 is used to contain the colored charged particles 162, the electrophoretic liquid 165 is filled into the micro-container 164, and the colored charged particles 162 are dispersed in the electrophoretic liquid 165. In the present embodiment, the electrophoretic liquid 165 is transparent, but in other embodiments, the electrophoretic liquid 165 can also has the color different to the color of the charged particles 162. The lateral electrodes 163 described above are disposed besides the micro-container 164, and the number of the lateral electrode 163 can be one or more, so as to improve the effect of controlling the charged particles 162. Moreover, the reflective electrode 161 is located between the micro-container 164 and the first substrate 120. The micro-containers 164 can be respectively disposed between each of the reflective electrodes 161 and the second substrate 140. Because the micro-container 164 constrains the movement of the charged particles 162 and forms an isolated region for control, the configuration of the micro-containers 164 can be changed to generate different display effects or image reflection effects. To be more specific, in other embodiments, the sizes of all the micro-containers 164 and the reflective electrodes 161 may not be the same, and those can be changed in accordance with the design of the display panel 100, so as to change the sizes of the reflection region and the reflection rate of the incident light. Moreover, by changing the configuration and the size of the micro-containers 164, the color effect displayed by different colored charged particles is different as well.

Figure 2:
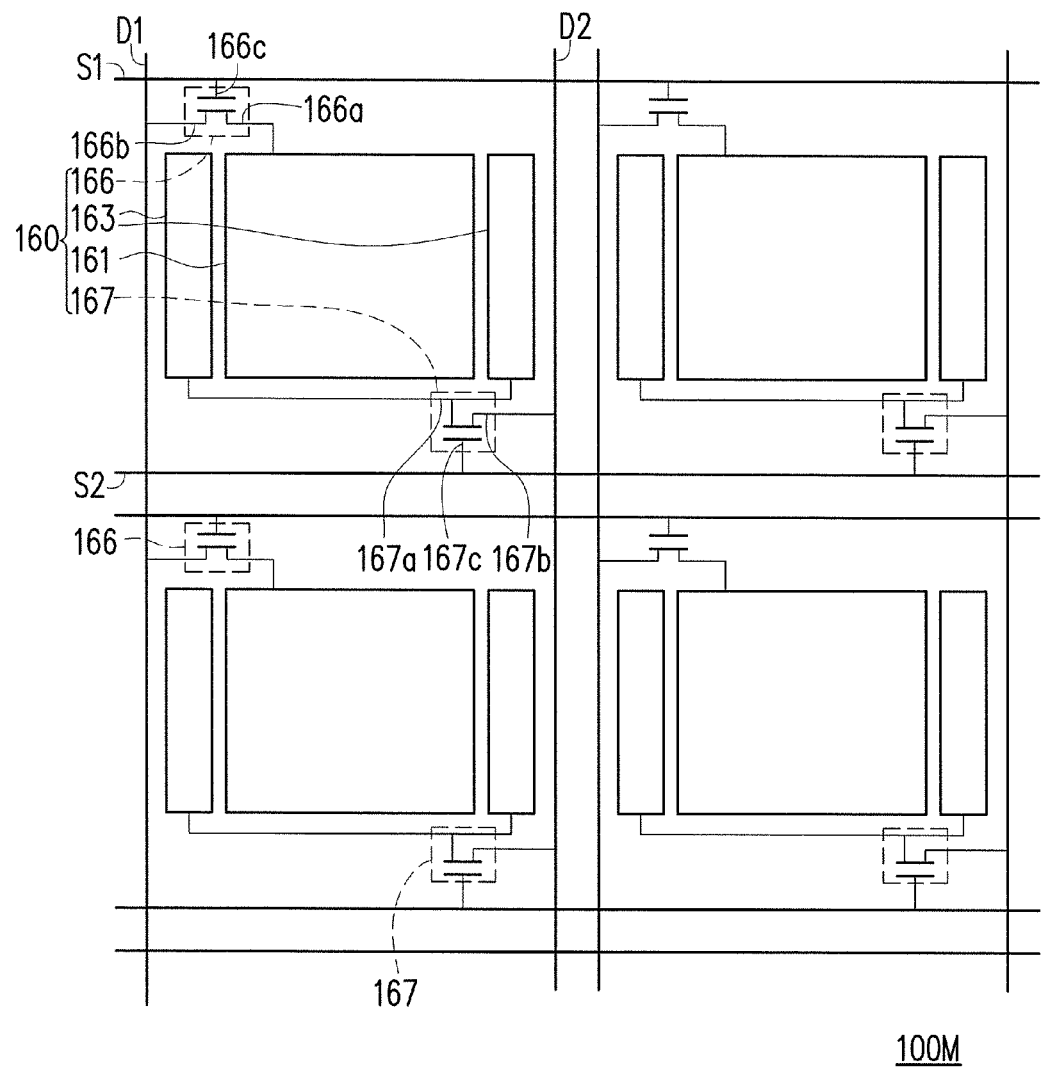
FIG. 2 is a schematic diagram of a pixel matrix according to an embodiment of the disclosure.

In the display panel 100 provided by the present disclosure, the reflective electrode 161 and the lateral electrodes 163 are respectively and independently controlled, and the wiring of the driving circuit is different to the wiring of the general display panel. FIG. 2 is a schematic diagram of a pixel unit matrix 100M according to an embodiment of the disclosure. Referring to FIG. 2, each of the pixel units 160 further includes a first active element 166 and a second active element 167. The first active element 166 has a first terminal 166a, a second terminal 166b and a control terminal 166c, and the second active element 167 also has a first terminal 167a, a second terminal 167b and a control terminal 167c. The first terminal 166a of the first active element 166 is coupled to the reflective electrode 161, and the first terminal 167a of the second active layer 167 is coupled to the lateral electrodes 163. Further, in the present embodiment, the display panel further includes a first scan line S1, a second scan line S2, a first data line D1 and a second data line D2. The first scan line S1 is coupled to the control terminal 166c of the first active element 166, and the second scan line S2 is coupled to the control terminal 167c of the second active element 167. The first data line D1 is coupled to the second terminal 166b of the first active element 166, and the second data line D2 is coupled to the second terminal 167b of the second active element 167.

The first active element 166 and the second active element 167 in the present embodiment are the thin-film transistor (TFT). Therefore, the control terminals 166c, 167c of the first and the second active layer 166, 167 can be the gate of the transistors, and the first terminals 166a, 167a and the second terminals 166b, 167b of the first and the second active elements 166, 167 can respectively be the drain and the source of the transistors (or the source and the drain of the transistors which are opposite to the previous description). The detailed control method is provided below. When the display panel 100 is intended to apply the first voltage V1 to the reflective electrode 161 of the pixel unit 160 (as shown in FIG. 1B) for image displaying, the first scan line S1 is enable to turn on the first active element 166 through the control terminal 166c of the first active element 166. At the moment, the first voltage V1 is transmitted to the reflective electrode 161 through the first data line D1, the second terminal 166b of the active element and the first terminal 166a of the active element, so as to control the charged particles 162 to approach the second substrate 140 for displaying the color of the charged particles 162 (as shown in FIG. 1B). In contrast, when the display panel 100 is intended to apply the second voltage V2 to the lateral electrodes 163 of the pixel unit 160 in order to reflect the incident light IL, the second scan line S2 is enable to turn on the second active element 167 through the control terminal 167c of the second active element 167. At the moment, the second voltage V2 is transmitted to the lateral electrodes 163 through the second data line D2, the second terminal 167b of the active element and the first terminal 167a of the active element, so as to attract the charged particles 162 to move towards the lateral electrodes 163. The reflective electrode 161 is then exposed by the charged particles 162, such that the incident light IL is reflected out of the display panel 100 through the second substrate 140 by the reflective electrode 161 (as shown in FIG. 1C).

In the present embodiment, as for a single pixel unit 160, the first can line S1 and the second scan line S2 are respectively turned on to avoid disorder on controlling the charged particles 162. Furthermore, by respectively controlling the plurality of first scan lines S1 and second scan lines S2 of the pixel unit matrix 100M, the first voltage V1 or the second voltage V2 can be respectively applied to each of the pixel units 160, so that the display panel 100 is regionally operated in different modes for applying different functions, but not only a display panel for executing a single function. Moreover, the configuration of the scan lines and the data lines is not limited to the pattern shown in the present embodiment, and may be other configurations. For example, in another embodiment, the number of the data line coupled to each of the pixel units is one.

Figure 3:
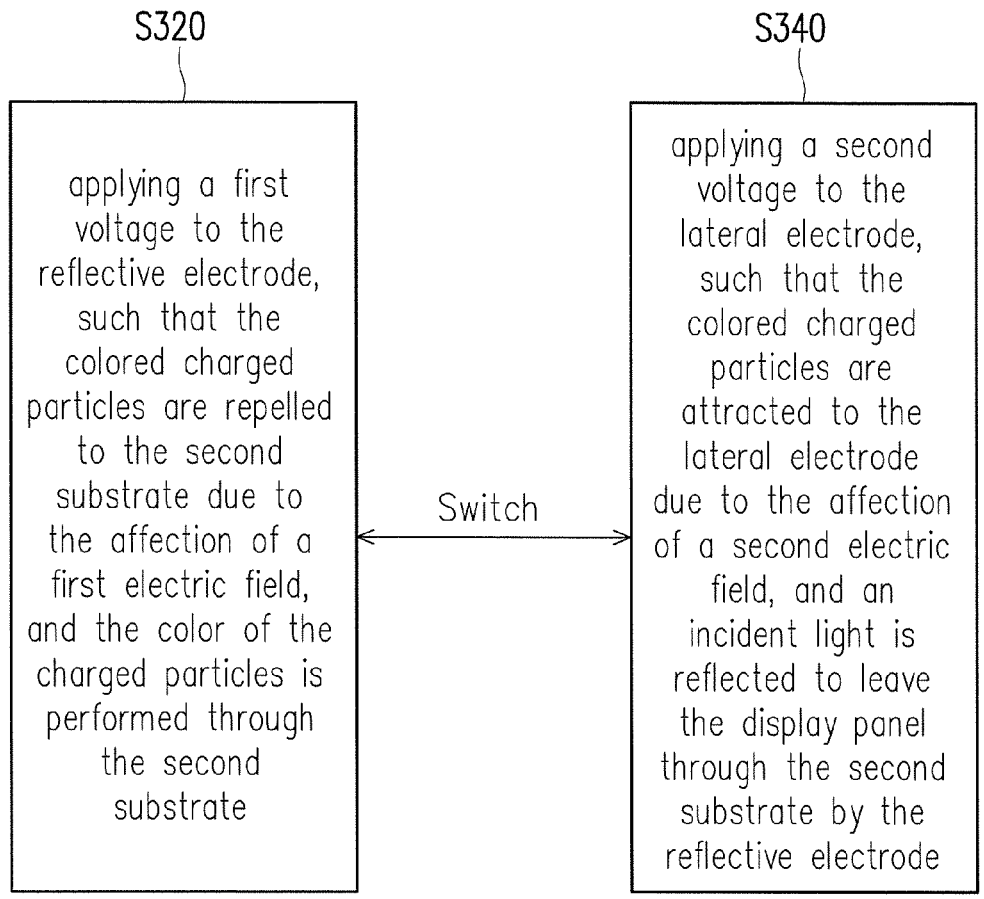
FIG. 3 is a flowchart illustrating a method for driving the display panel according to an embodiment of the disclosure.

FIG. 3 is a flowchart illustrating a method for driving the display panel according to an embodiment of the disclosure. The display panel includes a first substrate, a second substrate and a plurality of pixel units disposed between the first substrate and the second substrate, and each of the pixel units includes a plurality of colored charged particles, a reflective electrode and a lateral electrode. The rest of the configuration of the display panel can be derived from the previous embodiment, and thus are not to be reiterated herein. Referring to FIG. 3, the driving method includes the following steps. In the step 320, a first voltage is applied to the reflective electrode such that the colored charged particles are repelled to the second substrate due to the affection of the first electric field, and the color of the charged particles is displayed through the second substrate. In the step 340, a second voltage is applied to the lateral electrode such that the colored charged particles are attracted to the lateral electrode due to the affection of the second electric field, and the incident light is reflected out of the display panel through the second substrate by the reflective electrode. The first electric field and the second electric field are respectively generated according to the first voltage and the second voltage, so the magnitudes and the directions of the first electric field and the second electric field can be adjusted by applying the first voltage and the second voltage. Further, when the driving method is intended to change the operation mode of the pixel unit, the voltage provided to the pixel unit is changed to repeatedly execute the steps S320 and S340.

In view of the foregoing, by applying different voltages through different electrodes, the display panel of the present disclosure provides different functions and operation methods. When a first voltage is applied to the pixel unit, the colored charged particles are correspondingly repelled to the second substrate by the first electric field, so that the color of the charged particles is displayed through the second substrate. When a second voltage is applied to the pixel unit, the charged particles are correspondingly attracted to the lateral electrode by the second electric field, so that the incident light is reflected by the reflective electrode to generate the effect as the mirror. Therefore, except the display effect, the display panel further can be used like a mirror, so that the display panel has the broader usage. Further, the display panel does not employ the light source, so it also has the advantages such as low power consumption and low cost. The present application further provides a driving method of the display panel for respectively providing the first voltage and the second voltage to the pixel units, such that the display panel can achieve the effect of switching the operation modes described above.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A display panel, comprising:
    a first substrate;
    a second substrate; and
    a plurality of pixel units, disposed between the first substrate and the second substrate, and each of the pixel units comprising a reflective electrode disposed on the first substrate, a plurality of colored charged particles located between the reflective electrode and the second substrate, a lateral electrode disposed on the first substrate and extended towards the second substrate, a first active element having a first terminal, a second terminal and a control terminal, and a second active element having a first terminal, a second terminal and a control terminal, wherein the first terminal of the first active element is coupled to the reflective electrode and the first terminal of the second active element is coupled to the lateral electrode, and
    wherein when a first voltage is applied to the reflective electrode, the colored charged particles of the pixel unit are repelled to the second substrate due to the affection of a first electric field, and the color of the charged particles is displayed through the second substrate, when a second voltage is applied to the lateral electrode, the colored charged particles of the pixel unit are attracted to the lateral electrode due to the affection of a second electric field, so that an incident light is reflected out of the display panel through the second substrate by the reflective electrode.

2. The display panel as claimed in claim 1, wherein each of the pixel units further comprises:
    a micro-container, containing the colored charged particles; and
    an electrophoretic liquid, filled in the micro-container, and the colored charged particles are dispersed in the electrophoretic liquid, wherein the lateral electrode is disposed besides the micro-container.

3. The display panel as claimed in claim 2, wherein each of the micro-containers is respectively disposed between each of the reflective electrodes and the second substrate.

4. The display panel as claimed in claim 1, wherein the first electric field is generated according to the first voltage, and the second electric field is generated according to the second voltage.

5. The display panel as claimed in claim 1, wherein the colored charged particles comprise red charged particles, green charged particles and blue charged particles.

6. The display panel as claimed in claim 1, wherein the second substrate is a transparent substrate.

7. The display panel as claimed in claim 1, further comprises
a first scan line;
a second scan line;
a first data line; and
a second data line, wherein the first scan line is coupled to the control terminal of the first active element, the second scan line is coupled to the control terminal of the second active element, the first data line is coupled to the second terminal of the first active element and the second data line is coupled to the second terminal of the second active element.

8. A driving method of the display panel, the display panel comprising a first substrate, a second substrate and a plurality of pixel units disposed between the first substrate and the second substrate, wherein each of the pixel units comprises a first active element, a second active element, a plurality of colored charged particles, a reflective electrode and a lateral electrode, the reflective and the lateral electrodes are disposed on the first substrate, the lateral electrode is extended towards the second substrate, the colored charged particles are disposed between the reflective electrode and the second substrate, the first active element has a first terminal, a second terminal and a control terminal, the second active element has a first terminal, a second terminal and a control terminal, the first terminal of the first active element is coupled to the reflective electrode and the first terminal of the second active element is coupled to the lateral electrode, and the driving method comprising:

applying a first voltage to the reflective electrode through transmitting the first voltage to the second terminal of the first active element and turning on the first active element, such that the colored charged particles are repelled to the second substrate due to the affection of a first electric field, and the color of the charged particles is displayed through the second substrate; and applying a second voltage to the lateral electrode through transmitting the second voltage to the second terminal of the second active element and turning on the second active element, such that the colored charged particles are attracted to the lateral electrode due to the affection of a second electric field, and an incident light is reflected out of the display panel through the second substrate by the reflective electrode.

9. The driving method of the display panel as claimed in claim 8, wherein the first electric field is generated according to the first voltage, and the second electric field is generated according to the second voltage.

* * * * *